(12) United States Patent
Ueshima et al.

(10) Patent No.: US 8,475,951 B2
(45) Date of Patent: Jul. 2, 2013

(54) BATTERY UNIT FOR VEHICLES

(75) Inventors: Hiroshi Ueshima, Anjo (JP); Tomoyasu Takeuchi, Chita-gun (JP); Ryuichirou Shinkai, Kariya (JP); Yoshimitsu Inoue, Chiryu (JP)

(73) Assignee: Denso Corporation, Kariya (JP)

( * ) Notice: Subject to any disclaimer, the term of this patent is extended or adjusted under 35 U.S.C. 154(b) by 798 days.

(21) Appl. No.: 12/398,564

(22) Filed: Mar. 5, 2009

(65) Prior Publication Data

US 2009/0226800 A1 Sep. 10, 2009

(30) Foreign Application Priority Data

Mar. 5, 2008 (JP) ................................. 2008-055369

(51) Int. Cl.
*H01M 10/50* (2006.01)

(52) U.S. Cl.
USPC ........................................................ 429/120

(58) Field of Classification Search
USPC ........................................................ 420/120
See application file for complete search history.

(56) References Cited

U.S. PATENT DOCUMENTS

2006/0093901 A1 * 5/2006 Lee et al. ...................... 429/120

FOREIGN PATENT DOCUMENTS

| JP | 61-39860 | | 3/1986 |
| JP | 10-144266 | | 5/1998 |
| JP | 2001143769 A | * | 5/2001 |
| JP | 2003-163036 | | 6/2003 |
| JP | 2005-071674 | | 3/2005 |
| JP | 2005071674 A | * | 3/2005 |
| JP | 2007200778 A | * | 8/2007 |

OTHER PUBLICATIONS

Chinese Office Action dated Oct. 8, 2010, issued in corresponding Chinese Application No. 200910126176.0 with English Translation.

* cited by examiner

*Primary Examiner* — Ula C Ruddock
*Assistant Examiner* — Daniel Gatewood
(74) *Attorney, Agent, or Firm* — Nixon & Vanderhye P.C.

(57) ABSTRACT

A battery unit for vehicles comprises a plurality of battery, bus bars, and insulating plates. The plurality of batteries is installed with the terminals facing in the same direction, where the direction to which the pairs of terminals are facing is arranged in the same direction and the batteries are electrically connected by the bus bars. A refrigerant flows in the direction to which the pairs of terminals are connected, and cools the terminals and the bus bars. The insulating plates are disposed between the bus bars connected with different batteries. In addition, the insulating plates and are disposed extending in the direction to which the pairs of terminals are connected.

8 Claims, 13 Drawing Sheets

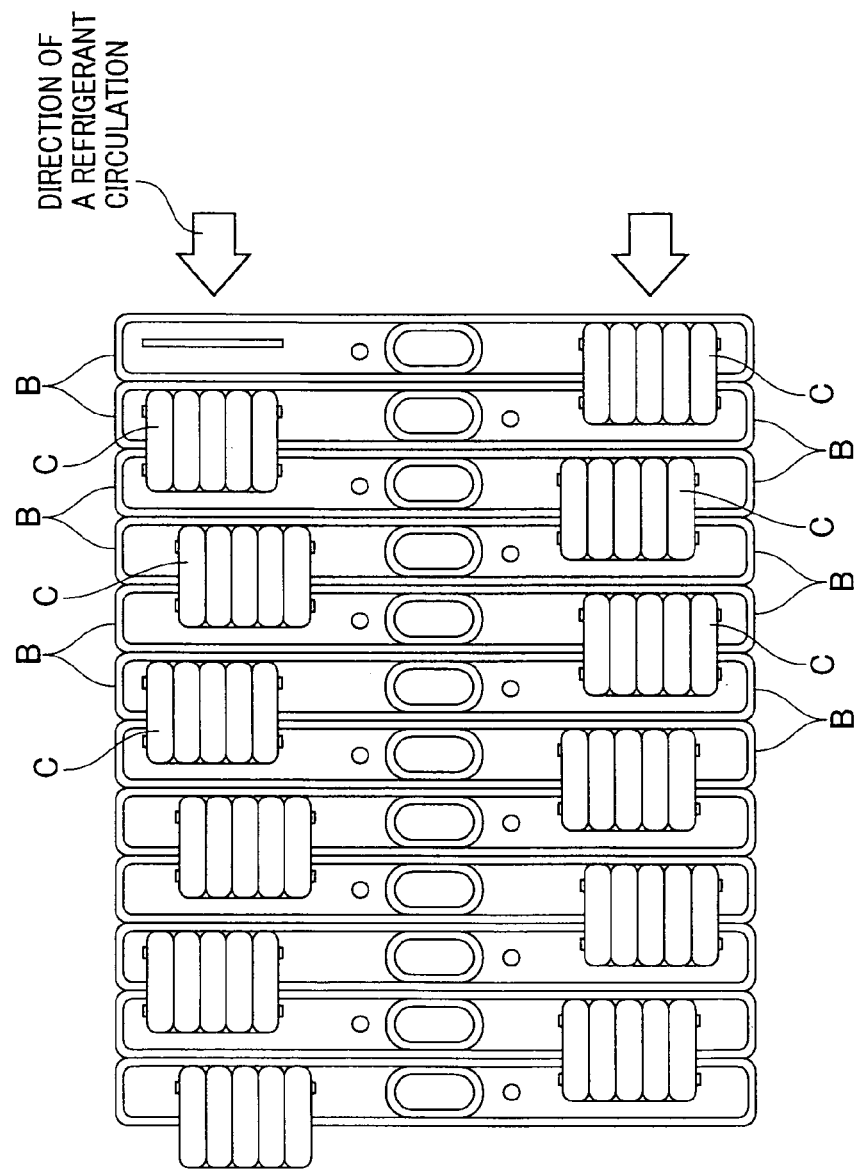

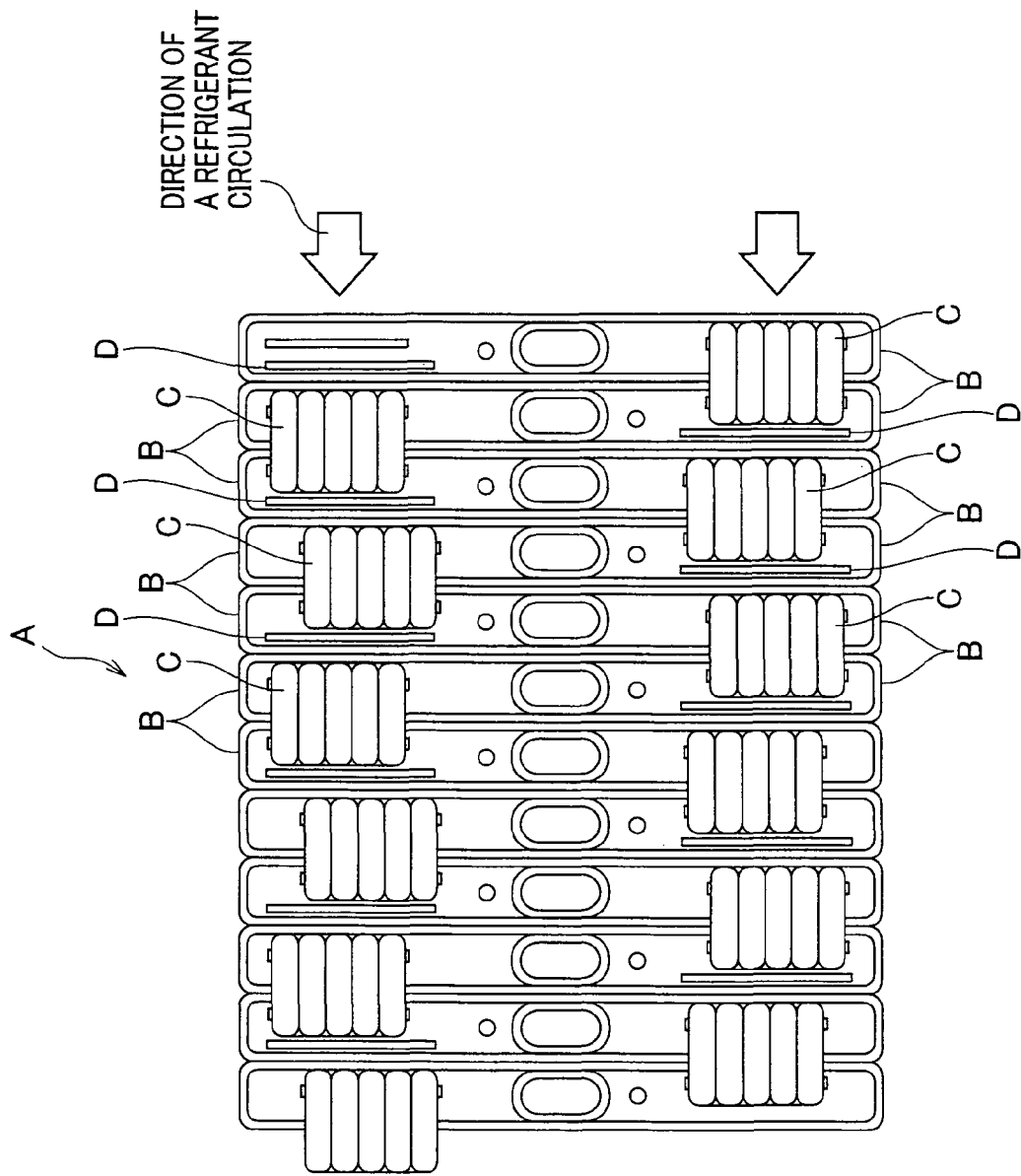

BATTERY UNIT FOR VEHICLES

CROSS-REFERENCE TO RELATED APPLICATION

This application is based on and claims the benefit of priority from earlier Japanese Patent Application No. 2008-55369 filed Mar. 5, 2008, the description of which is incorporated herein by reference.

BACKGROUND OF THE INVENTION

1. Technical Field of the Invention

This invention relates to a battery unit for vehicles having a plurality of batteries connected electrically by connecting members.

2. Description of the Related Art

In recent years, the lithium batteries and the nickel batteries that have high output and high-energy capacity have been put to practical use as a power supply for driving an automobile. These batteries are provided with electrodes, terminals, and battery containers. A plurality of batteries are grouped together and used as a battery unit.

When the battery unit is used for driving the automobile, intense electric charge/electric discharge will be repeated. Therefore, temperature may be raised by the heat generation of the electrodes accompanying a chemical reaction, and there will be a chance that the performances of the batteries may be deteriorated.

Conventionally, there is disposed in Japanese Patent Application Laid-Open Publication No. 2005-71674, for example, a battery unit for vehicles that can suppress such a heat rise. FIG. 12 shows an upper surface of a conventional battery unit for vehicles, and FIG. 13 shows the upper surface of the conventional battery unit for vehicles with insulating members being provided thereto.

As shown in FIG. 12, a battery unit A for vehicles comprises a plurality of batteries B and a plurality of bus bars C. Pairs of terminal members are projected from the upper surface of each battery B. A plurality of batteries B is laminated in the direction of its thickness to form the battery unit A. The terminal members of the batteries B adjoining in the lamination direction are connected in series with the bus bars C with which the cooling fins are formed.

The heat generated with the electrodes radiates the heat to a heat carrier such as a refrigerant via the terminal members and the bus bar C, by having the refrigerant flow in the lamination direction along the upper surface of the batteries B. Thereby, the rise in heat of the battery unit for vehicles A can be suppressed.

In the battery unit A mentioned above, however, the rise of the heat is suppressed by radiating the generated heat into the refrigerant. There is a possibility that the bus bars C may be short circuited when the bus bars C dew with the humidity contained in the refrigerant, or when a foreign substance is mixed into the refrigerant.

Therefore, insulations arranged between the bus bars C of the adjoining batteries B in the lamination direction are necessary to be secured especially. However, in order to secure the insulations between the bus bars C, insulating members D must be arranged extending in the direction perpendicular to the flow of the refrigerant, as shown in FIG. 13.

Thus, there was a problem that a cooling capability would fall due to the flow of the refrigerant being barred.

SUMMARY OF THE INVENTION

The present invention has been made in order to solve the issue described above, and has as its object to provide a battery unit for vehicles that can secure the insulation between the connecting members of the batteries arranged adjoining each other without barring the flow of a heat carrier.

In order to resolve the problems, the inventor of the present invention has devoted to researches through much trial and error. As a result, the inventor came to complete the present invention by arranging a plurality of batteries side-by-side and devising the circulation direction of a heat carrier that would make possible to arrange the insulating members that insulates between connecting members without barring the flow of a heat carrier.

Specifically, in the battery unit for vehicles according to a first aspect, a battery unit for vehicles comprises a plurality of batteries, a battery container, pairs of terminals provided to the batteries that project in the same direction from a surface of the battery container, and a connecting member connected to the terminals for connecting the plurality of batteries electrically, wherein, the plurality of batteries are installed with the terminals and the surfaces of the battery containers facing in the same direction, where a direction to which the pairs of terminals are facing is arranged in the same direction.

The terminals and the connecting member are cooled or heated by a heat carrier that flows in the direction to which the pairs of terminals are connected along with the surface of the battery container, and the battery unit for vehicles further comprises an insulating member having no electrical conductivity that extends in the direction which the pairs of terminals are connected between the connecting members arranged adjoining each other that are electrically connected to the different batteries.

According to the above composition, the plurality of batteries is installed facing the terminals in the same direction, where a direction to which the pairs of terminals are connected is arranged in the same direction, and are electrically connected by the connecting members. A heat carrier flows in the direction to which the pairs of terminals are connected, and cools or heats the terminals and the connecting members.

Here, the insulating members are disposed between the connecting members arranged by adjoining each other and connected with different batteries. In addition, the insulating members are disposed extending in the direction to which the pairs of terminals are connected.

Therefore, the insulating members do not extend intersecting perpendicularly with the flow of the heat carrier like the conventional battery unit. As a result, insulations between the connecting members that are arranged adjoining and connected with different batteries can be secured without barring the flow of the heat carrier.

In the battery unit for vehicles according to a second aspect, the insulating member has high thermal conductivity and disposed between the batteries, where the insulating member is contacted thermally to the battery container.

In the battery unit for vehicles according to a third aspect, the insulating member is thermally insulating and disposed between the batteries, where the insulating member is contacted to the battery container.

In the battery unit for vehicles according to a fourth aspect, the insulating member has elasticity in a direction that intersects perpendicularly to the direction that pairs of terminals are connected, and a direction in which the batteries are installed side by side.

In the battery unit for vehicles according to a fifth aspect, the battery unit for vehicles further comprises a 1st heat conduction member extending in the direction to which the pairs of terminals are connected, that is connected thermally to the connecting members.

In the battery unit for vehicles according to a sixth aspect, the battery unit for vehicles further comprises a 2nd heat conduction member having no electrical conductivity extending in the direction to which the pairs of terminals are connected, that is connected thermally at least to the one of the pairs of terminals or the connecting members that are connected electrically to the pairs of terminals.

In the battery unit for vehicles according to a seventh aspect, the connecting members connect the plurality of batteries in series.

In the battery unit for vehicles according to an eighth aspect, the plurality of batteries is equipped in a vehicle.

It should be appreciated that the labels "1st and 2nd heat conduction members" are introduced for convenience, in order to distinguish the heat conduction members.

BRIEF DESCRIPTION OF THE DRAWINGS

In the accompanying drawings:

FIG. 12 shows an upper surface of a conventional battery unit for vehicles; and

FIG. 13 shows the upper surface of the conventional battery unit for vehicles with insulating members being provided thereto.

DETAILED DESCRIPTION OF THE PREFERRED EMBODIMENTS

With reference to the accompanying drawings, an embodiment of the present invention will now be described in detail.

This embodiment shows an example applied to a battery unit for vehicles that consists of a lithium ion battery in which the battery unit for vehicles concerning this invention is equipped by vehicles, such as an automobile.

1st Embodiment

Figure 1:
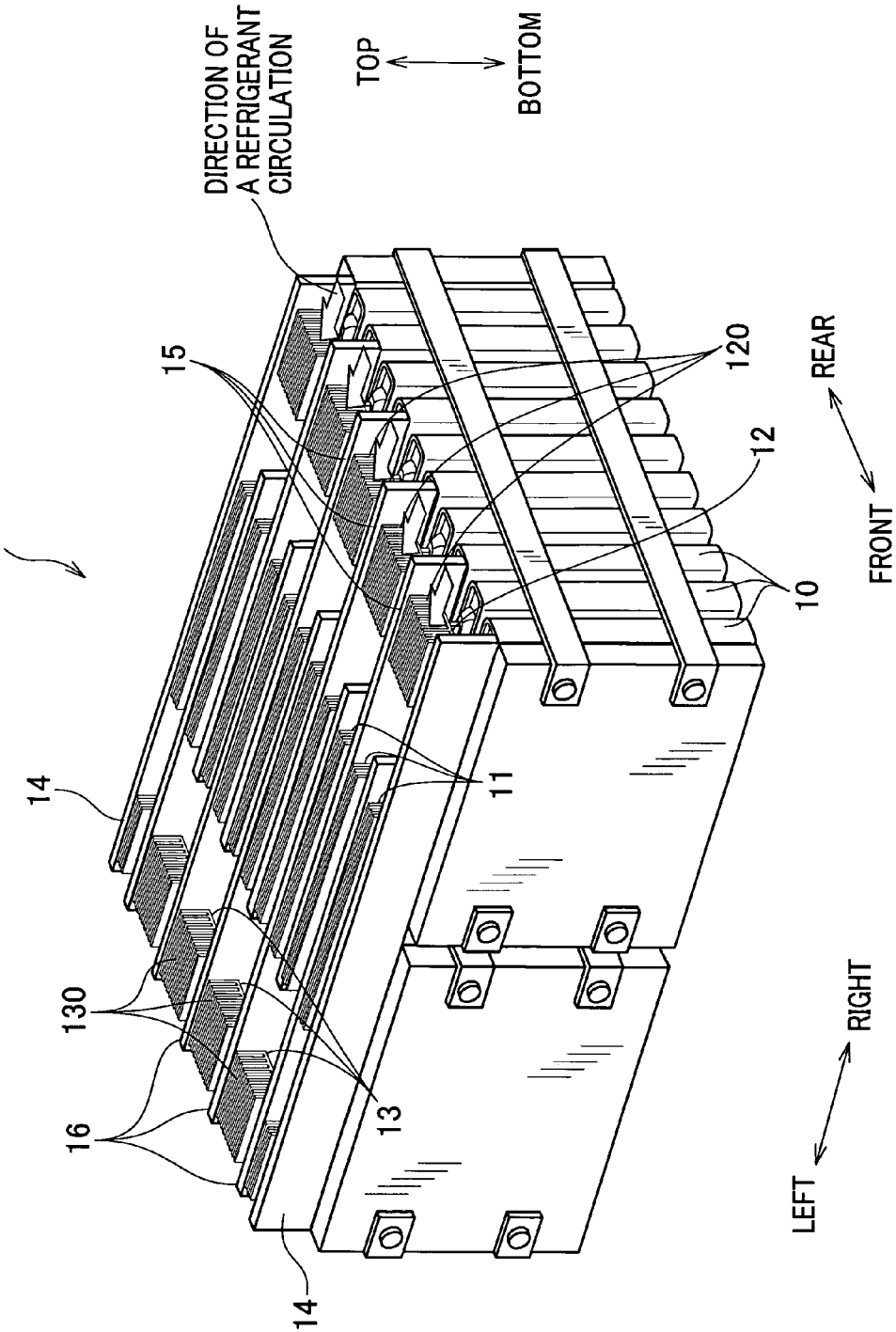
FIG. 1 shows the composition of a battery unit for vehicles in the 1st embodiment.
Figure 2:
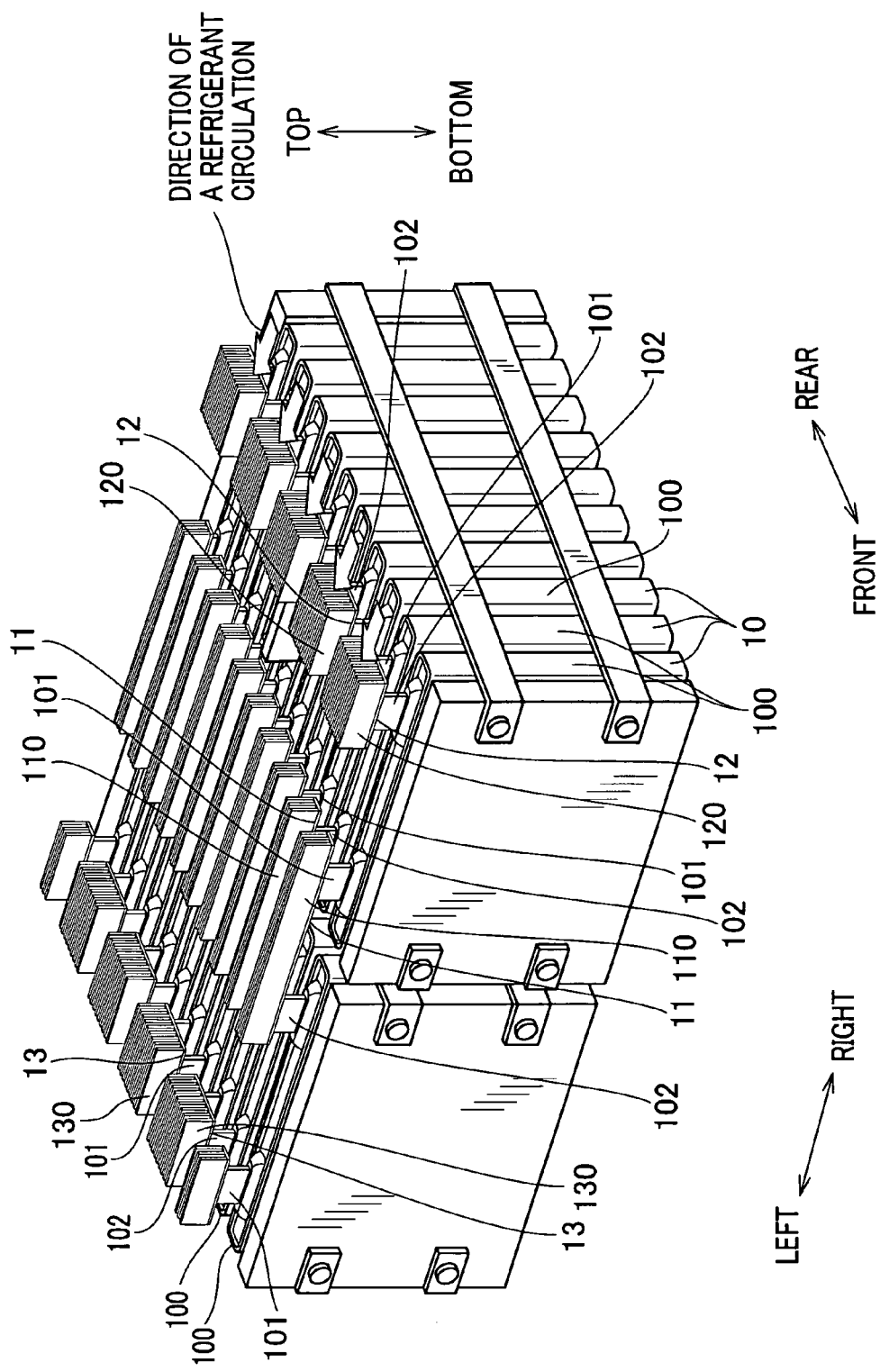
FIG. 2 shows the perspective diagram of the battery unit for vehicles shown in FIG. 1 in the state where an insulating plate is not arranged thereto.
Figure 3:
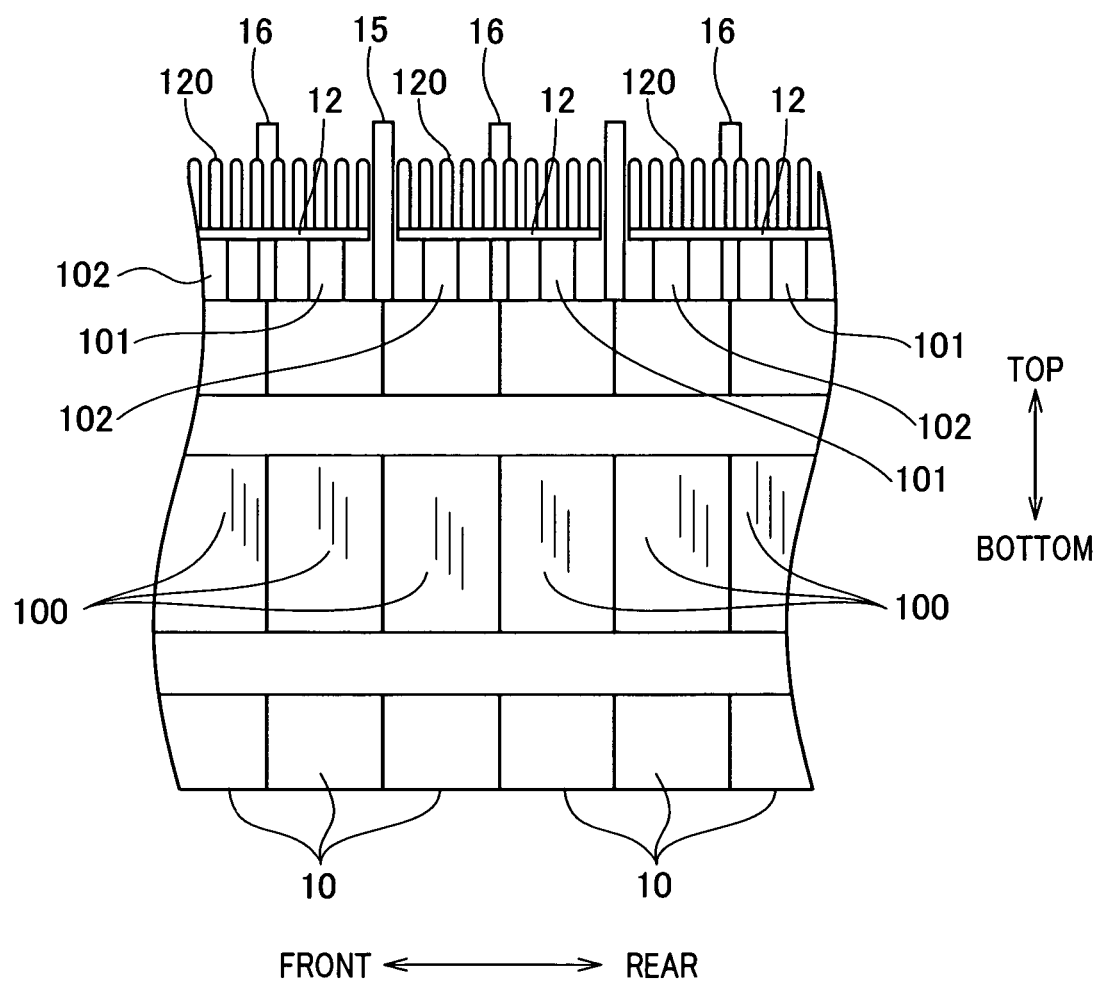
FIG. 3 shows the partial side view of the battery unit for vehicles shown in FIG. 1 being seen from right-hand side thereof.

First, the composition of the battery unit for vehicles is explained with reference to FIGS. 1-3. Here, FIG. 1 is a perspective diagram of the battery unit for vehicles in the 1st embodiment. FIG. 2 is a perspective diagram of the battery unit for vehicles shown in FIG. 1 in the state where insulating plates are not arranged thereto. FIG. 3 is a partial side view of the battery unit for vehicles shown in FIG. 1 being seen from right-hand side thereof. Directions for front and rear, left and right, and top and bottom are introduced in the figures for convenience, in order to explain the battery unit for vehicles. In addition, white arrows in the figures show the direction of a refrigerant circulation.

As shown in FIGS. 1 and 2, the battery unit for vehicles 1 (hereafter, simplified to "the battery unit 1") comprises a plurality of batteries 10, a plurality of bus bars 11-13 (connecting members), a plurality of insulating plates 14-16 (insulating members).

As shown in FIG. 2, each battery 10 is provided with a pair of terminals, i.e. a positive terminal 101 (terminal) and a negative terminal 102 (terminal) that project in the same direction from a surface of a rectangular parallelepiped-like case 100 (battery container).

A plurality of batteries 10 is installed in the left-right direction perpendicular to the upper surfaces of the cases 100, and where the direction to which the pairs of terminals are connected is arranged with the same direction. To be specific, for example, a plurality of batteries 10 is laminated in the front-rear direction side by side to form a battery group, and a pair of battery groups is installed in the left-right direction side by side.

The batteries 10 installed in the front-rear direction are arranged with opposite polarity terminals closes to each other so that the positive terminals 101 and the negative terminals 102 may counter the front-rear direction mutually.

The batteries 10 installed in the left-right direction are arranged so that the positive terminals 101 and the negative terminals 102 may counter in the left-right direction mutually. By sealing a positive pole and a negative pole (both not shown) that occlude and emit lithium constitute the battery 10, and the non-water battery electrolyte made by dissolving electrolyte salt in non-water solvent in the case 100.

Further, the positive pole is electrically connected to the positive terminal 101, and the negative pole is electrically connected to the negative terminal 102, respectively.

The bus bars 11 are members made of, for example, rectangular metal plates, and electrically connected in series in the left-right direction between the batteries 10.

The bus bars 11 are arranged in the center of the left-right direction of the battery unit 1. End parts of bus bars 11 are electrically connected to the positive terminals 101, and other ends are electrically connected to the negative terminals 102, respectively. Cooling fins 110 (1st heat conduction members) are disposed on the upper surface of the bus bars 11.

The cooling fins 110 are members made of, for example, wave-shaped metal plates. The cooling fins 110 have high thermal conductivity with their surface areas larger than those of the bus bars 11 for radiating heat efficiently.

The both ends of the cooling fins 110, which are wave-shaped, face to the right and to the left, and the cooling fins 110 are thermally connected to the upper surfaces of the bus bars 11 extending in the left-right direction.

The bus bars 12 are members made of, for example, square metal plates, and electrically connected in series in the front-rear direction between the batteries 10. The bus bars 12 are arranged in the front-rear direction electrically, and are arranged at the right side of the battery unit 1.

The bus bars 13 are members made of, for example, square metal plates, and electrically connected in series in the front-rear direction between the batteries 10. The bus bars 13 are arranged in the front-rear direction electrically, and are arranged at the left side of the battery unit 1.

End parts of the bus bars 12 and 13 are electrically connected to the positive terminals 101, and other ends are electrically connected to the negative terminals 102, respectively. Cooling fins 120 and 130 (1st heat conduction members) are disposed on the upper surface of the bus bars 12 and 13.

The cooling fins 120 and 130 are members made of, for example, wave-shaped metal plates. The cooling fins 120 and 130 have high thermal conductivity with their surface areas larger than those of the bus bars 11 for radiating heat efficiently.

The both ends of the cooling fins 120 and 130, which are wave-shaped, face to the right and to the left, and the cooling fins 120 and 130 are thermally connected to the upper surfaces of the bus bars 12 and 13 to extend in the left-right direction.

As shown in FIGS. 1 and 2, the insulating plates 14 are the rectangular plate-like members and have no electrical conductivity that insulate the bus bars 11-13 and the cooling fins 110, 120, and 130 from the exterior, which are electrically connected to the foremost and backmost batteries 10 in the part of the battery unit 1.

The insulating plate 14 is arranged extending in the left-right direction on the upper surface of the cases 100 in the front of the bus bars 11-13 arranged with the cooling fins 110, 120, and 130, which are connected to the foremost batteries 10.

In addition, the other insulating plate 14 is arranged extending in the left-right direction on the upper surface of the cases 100 behind the bus bars 11-13 arranged with the cooling fins 110, 120, and 130, which are connected to the rearmost batteries 10. The height of the insulating plates 14 is set higher than the height to the upper ends of the cooling fins 110, 120, and 130.

The insulating plates 15 and 16 are the rectangular plate-like members and have no electrical conductivity that insulate between the bus bars 11 with which the cooling fins 110 are arranged, and between the bus bars 12 with which the cooling fins 120 are arranged, and between the bus bars 13 with which the cooling fins 113 are arranged, respectively.

The cooling fins 110, 120, and 130 are electrically connected to the different batteries 10 adjoining the front-rear direction, respectively.

As shown in FIGS. 1-3, the insulating plates 15 are arranged extending in the left-right direction on the upper surface of the case 100 between the bus bars 11 with which the cooling fins 110 are disposed adjoining in the front-rear direction, and between the bus bars 12 with which the cooling fins 120 are disposed.

The height of the insulating plates 15 is set higher than the height to the upper ends of the cooling fins 110 and 120. Further, as shown in FIGS. 1-3, the insulating plates 16 are arranged extending in the left-right direction on the upper surface of the cases 100 between the bus bars 11 with which the cooling fins 110 are disposed adjoining in the front-rear direction, and between the bus bars 13 with which the cooling fins 130 are disposed.

The height of the insulating plates 16 is set higher than the height to the upper ends of the cooling fins 110 and 130.

Next, cooling operation of the battery unit for vehicles 1 is explained with reference to FIGS. 1 and 2.

The intense electric charge/electric discharge is repeated when the battery unit 1 shown in FIG. 1 is used in vehicles. Therefore, temperature rises by the heat generated inside the batteries 10.

As shown in FIGS. 1 and 2, the battery unit 1 is cooled with the refrigerant. Specifically, as a white arrow shows, the positive terminals 101, the negative terminals 102, and bus bars 11-13 are cooled by the refrigerant and/or air that flows from the right side to the left side along the upper surface of the cases 100.

The cooling fins 110, 120, and 130, which are higher in thermal conductivity than the bus bars 11-13, are thermally connected to the upper surfaces of the bus bars 11-13.

Therefore, the heat generated inside the batteries 10 can be radiated to a refrigerant via the positive terminals 101, the negative terminals 102, and the bus bars 11-13. Further, the heat can be efficiently radiated to the refrigerant via the cooling fins 110, 120, and 130.

It should be appreciated that the cooling fins 110, 120, and 130 are extended in the left-right direction where the refrigerant flows. Therefore, the heat can be radiated without barring the flow of the refrigerant.

There was a potential concern, by the way, that a short circuit might have occurred between the bus bars 11, between the bus bars 12, and between the bus bars 13 when the bus bars 11-13 dew with the humidity contained in the refrigerant, or when a foreign substance is mixed into the refrigerant.

However, the insulating plates 15 and 16 are disposed between the bus bars 11, between the bus bars 12, and between the bus bars 13. Therefore, electrical insulation between these bus bars 11-13 can be secured and a short circuit can be prevented.

In addition, the insulating plates 15 and 16 are extended in the left-right direction where the refrigerant flows. Therefore, the insulation can be secured without barring the flow of the refrigerant.

Finally an effect of the battery unit 1 is explained.

According to the 1st embodiment, a plurality of batteries 10 is installed with the terminals facing in the same direction, where the direction to which the pairs of terminals are facing is arranged in the same direction and the batteries 10 are electrically connected by the bus bars 11-13.

The refrigerant flows in the direction to which the pairs of terminals are connected, and cools the positive terminals 101, the negative terminals 102, and the bus bars 110, 120, and 130.

Here, the insulating plates 15 and 16 are disposed between the bus bars 12 and between the bus bars 13 that the bus bars 12 and 13 are arranged adjoining each other on to the different batteries 10. Further, the insulating plates 15 and 16 are disposed extending in the direction to which the pairs of terminals are connected.

Therefore, the insulating plates 15 and 16 do not extend intersecting perpendicularly with the flow of the refrigerant like the conventional battery unit.

As a result, insulations between the bus bars 11, between bus bars 12, and between bus bars 13 that are arranged adjoining and connected with different batteries 10 can be secured without barring the flow of the refrigerant in the battery unit 1 equipped in the vehicles.

Furthermore, according to the 1st embodiment, the thermally high conductive cooling fins 110, 120, and 130 are thermally connected to the upper surfaces of the bus bars 11-13. Thus, the bus bars 11-13 can be cooled via the cooling fins 110, 120, and 130. Consequently, the battery unit 1 can be cooled efficiently.

Moreover, according to the 1st embodiment, the plurality of batteries 10 is connected in series by the bus bars 11-13. Therefore, voltage of the battery unit 1 can be made higher.

Although the insulating plates 15 and 16 are the members having the shape of a plate and no electrical conductivity in the 1st embodiment as an example, it is not restricted so.

An insulating plate may be a member with no electrical conductivity and has elasticity in the direction that intersects perpendicularly to the direction that pairs of terminals are connected, and the direction in which the batteries 10 are installed side by side, specifically, in its thickness direction.

In this case, since the insulating plate deforms elastically even if the interval between the bus bars becomes narrow by the variation in the size of each part, a battery can be installed reliably. This can raise assembling characteristics.

Figure 4:
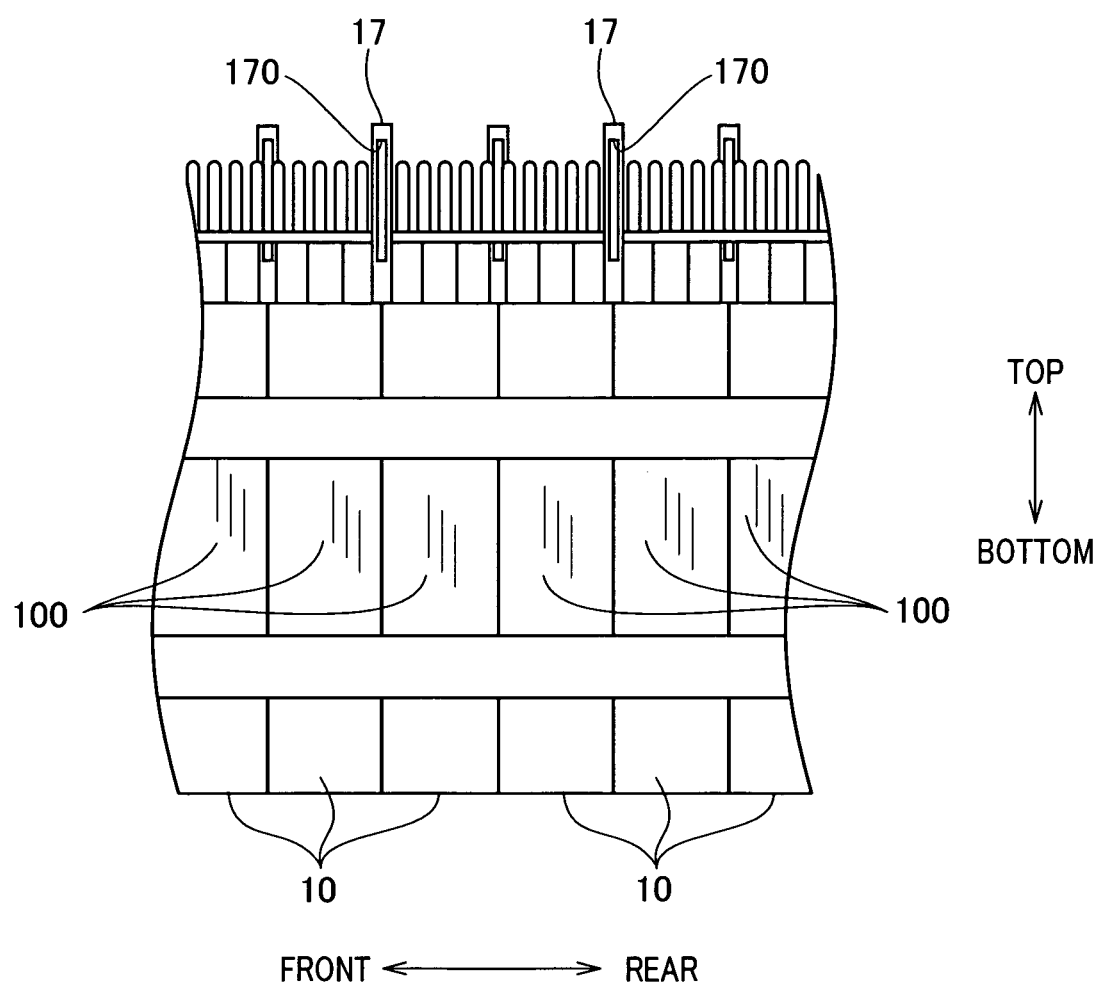
FIG. 4 shows the side view of the battery unit for vehicles in a modified form.

Specifically, as shown in FIG. 4, an insulating plate 17 may have elasticity in its thickness direction by forming a rectangular hole 170 on side end surfaces that penetrates to the left-right direction in FIG. 1.

Figure 5:
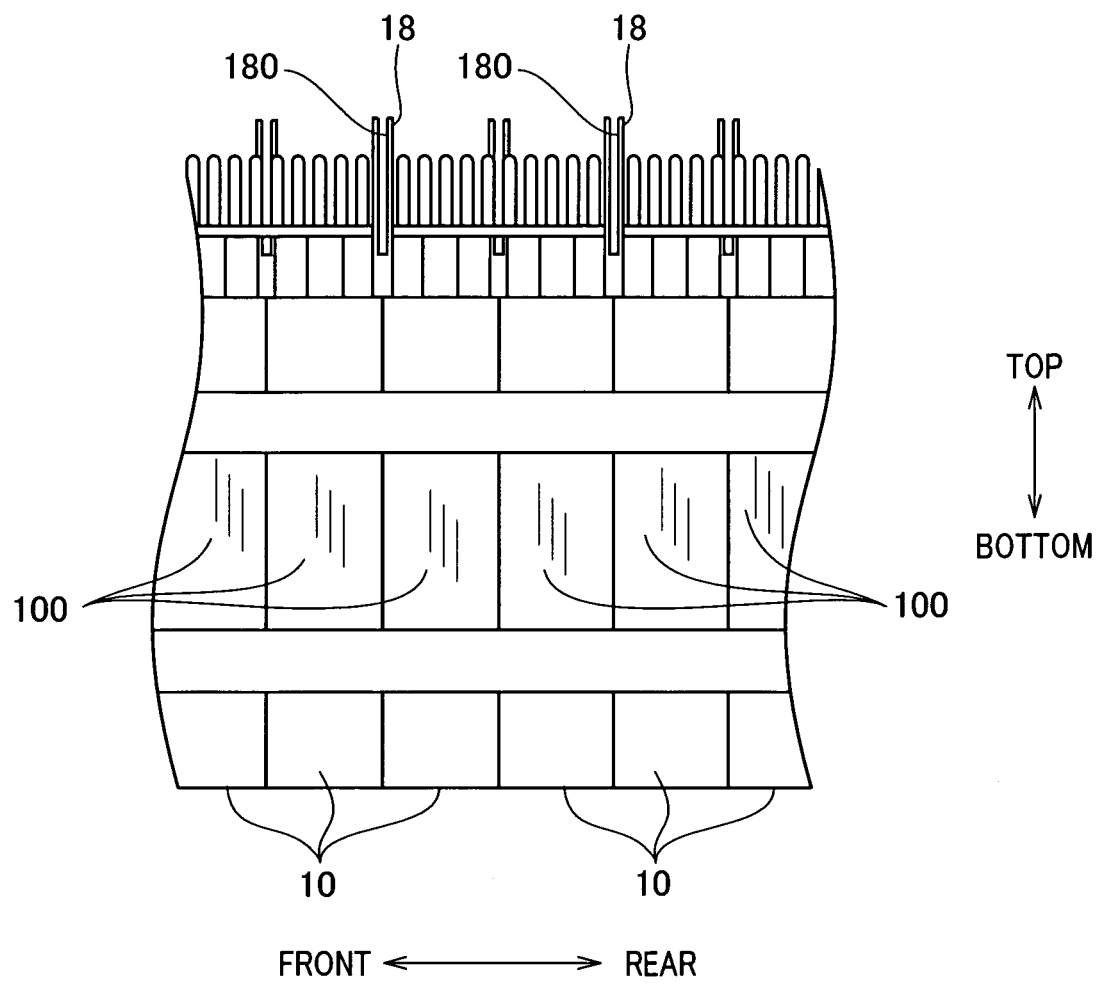
FIG. 5 shows the side view of the battery unit for vehicles in another modified form.

Moreover, as shown in FIG. 5, an insulating plate 18 may have elasticity in its thickness direction by forming a slot 180 on an upper end surface that extends to the left-right direction in FIG. 1.

2nd Embodiment

Next, a battery unit for vehicles of the 2nd embodiment is explained. The battery unit for vehicles of the 2nd embodiment is to change the insulating plates into what also have thermal conductivity, and arranged not only between the bus bars but also between the cases of the batteries to the battery unit for vehicles of the 1st embodiment.

Figure 6:
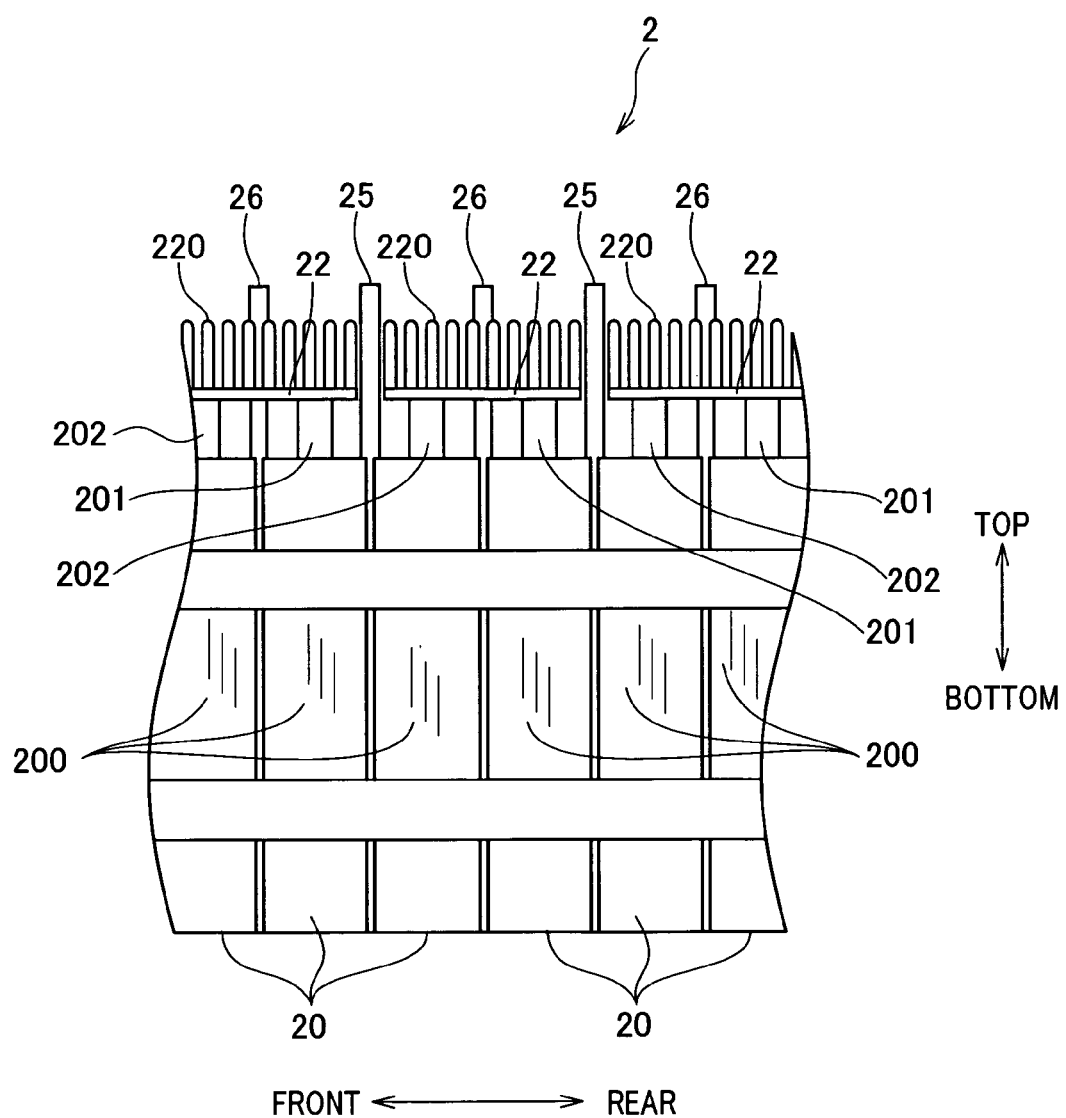
FIG. 6 shows the side view of the battery unit for vehicles in the 2nd embodiment.

First, the composition of the battery unit for vehicles is explained with reference to FIG. 6. Here, FIG. 6 is a side view of the battery unit for vehicles in the 2nd embodiment. Directions for front and rear, and top and bottom are introduced in the figures for convenience, in order to explain the battery unit for vehicles, and they show the same direction as the 1st embodiment.

Here, the insulating plates, which are different parts from the battery unit for vehicles of the 1st embodiment, is explained, and explanations are omitted about common parts except the parts where the explanation is needed.

As shown in FIG. 6, the battery unit for vehicles 2 (hereafter, simplified to "the battery unit 2") is provided with the insulating plates 2S and 26 (insulating members).

A battery 20, a case 200 (battery container), a positive terminal 201 (terminal), a negative terminal 202 (terminal), a bus bar 22 (connecting members), a cooling fin 220 (the 1st heat conduction member), and insulating plates 25 and 26 (insulating members) are the same composition as the battery 10, the case 100, the positive terminal 101, the negative terminal 102, the bus bar 12, the cooling fin 120, and the insulating plates 15 and 16 in the 1st embodiment.

The insulating plates 25 and 26 are the rectangular plate-like members and have no electrical conductivity, which also has thermal conductivity, and extended greatly below compared with the insulating plates 15 and 16 of the 1st embodiment. Specifically, the insulating plates 25 and 26 are the members that have thermal conductivity higher than the case 200.

The upper sides of the insulating plates 25 and 26 are arranged, like the insulating plates 15 and 16 of the 1st embodiment, between the bus bars 22 with which the cooling fins 220 are disposed.

On the other hand, the lower sides of the insulating plates 25 and 26 are arranged between the batteries 20, where the surfaces of the cases 200 are thermally contacted thereto.

Next, with reference to FIG. 6, a cooling operation and an effect of the battery unit for vehicles are explained. The battery unit 2 shown in FIG. 6 can radiate the heat generated inside the battery 20 to a refrigerant like the battery unit 1 of the 1st embodiment.

The cases 200 can be cooled via the insulating plates 25 and 26 that have thermal conductivity. Therefore, the battery unit 2 can be cooled (or heated) efficiently.

Although the insulating plates 25 and 26 are the members having the shape of a plate, thermal conductivity and no electrical conductivity in the 2nd embodiment as an example, it is not restricted so.

Similar to the 1st embodiment, an insulating plate may be a member having elasticity in the direction that intersects perpendicularly to the direction that a pairs of terminals are connected, and the direction in which the batteries 20 are installed side by side, specifically, in its thickness direction.

In this case, since the insulating plate deforms elastically even if the interval between the bus bars becomes narrow by the variation in the size of each part, a battery can be installed certainly. This can raise assembling characteristics.

Figure 7:
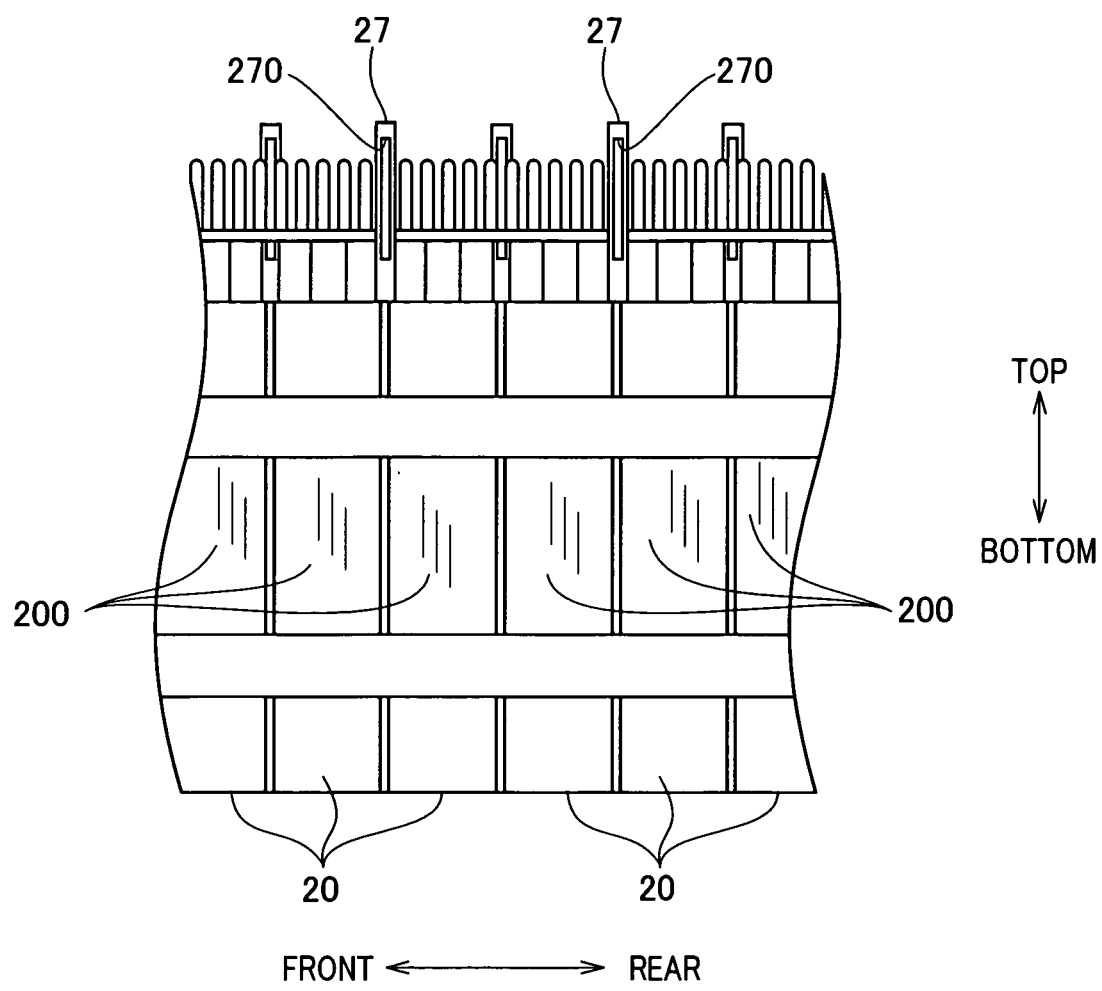
FIG. 7 shows the side view of the battery unit for vehicles in a modified form.

Specifically, as shown in FIG. 7, an insulating plate 27 may have elasticity in its thickness direction by forming a rectangular hole 270 on side end surfaces that penetrates to the left-right direction.

Figure 8:
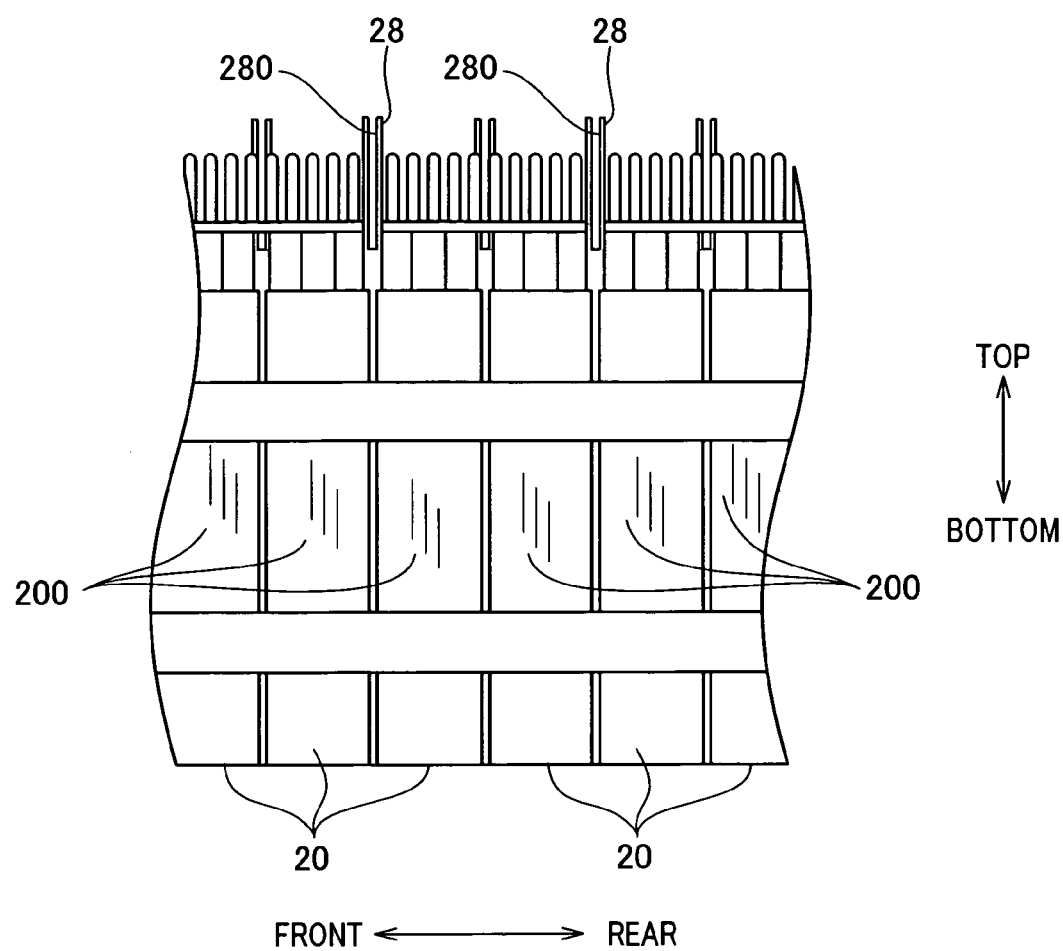
FIG. 8 shows the side view of the battery unit for vehicles in another modified form.

Moreover, as shown in FIG. 8, an insulating plate 28 may have elasticity in its thickness direction by forming a slot 280 on an upper end surface that extends to the left-right direction.

3rd Embodiment

Next, a battery unit for vehicles of the 3rd embodiment is explained. The battery unit for vehicles of the 3rd embodiment changes an insulating plate to the battery unit for vehicles of the 2nd embodiment. To be specific, the insulating plate is thermally insulating and has no electrical conductivity.

Figure 9:
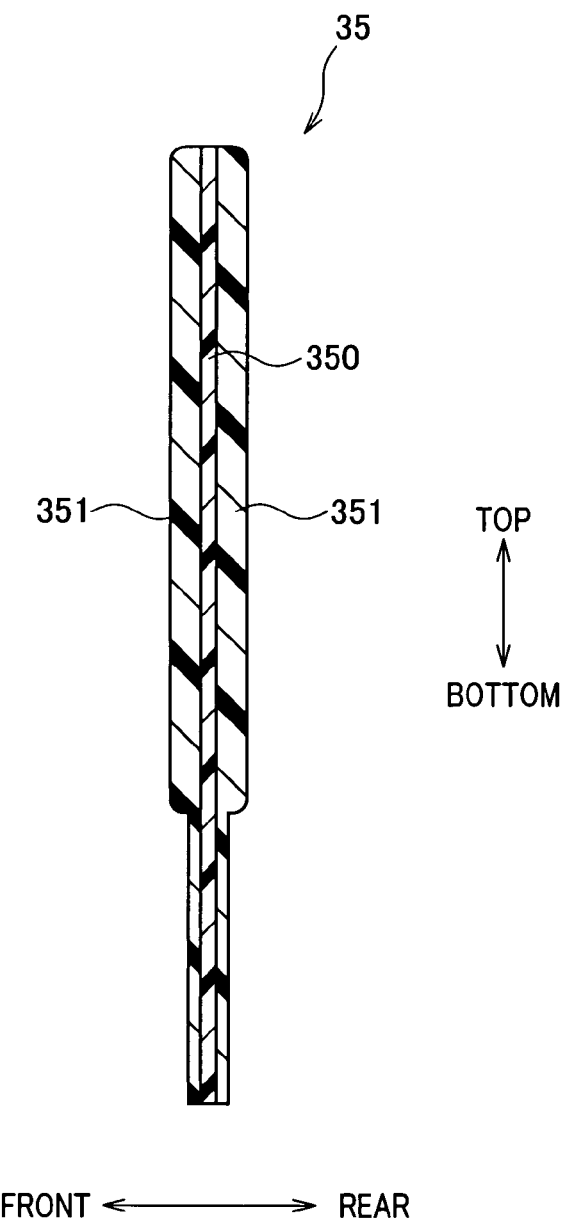
FIG. 9 shows the sectional view of the insulating plates of the battery unit for vehicles in the 3rd embodiment.

First, the composition of a battery unit for vehicles is explained with reference to FIG. 9. Here, FIG. 9 is a sectional view of the insulating plate of the battery unit for vehicles in the 3rd embodiment. Directions for front and rear, and top and bottom are introduced in the figures for convenience, in order to explain the battery unit for vehicles, and they show the same direction as the 2nd embodiment.

Here, the insulating plates, which are different parts from the battery unit for vehicles of the 2nd embodiment, is explained, and explanations are omitted about common parts except the parts where the explanation is needed.

The battery unit for vehicles is provided with the insulating plates 35 (insulating members) shown in FIG. 9. Constituent factors other than the insulating plates 35 are the same composition as that of the 2nd embodiment. The insulating plate 35 is the plate-like member having a shape of a rectangle and no electrical conductivity, which also has thermal conductivity.

The insulating plate is thermally insulating higher than the case in the direction that intersects perpendicularly to the direction that a pairs of terminals are connected, and the direction in which the batteries are installed side by side, specifically, in its thickness direction.

The insulating plate 35 comprises a thermally insulating part 350 and an electrically insulation part 351. The thermally insulating part 350 is a rectangle thin plate-like member that has adiabatic property. The electrically insulation part 351 is a rectangle thin plate-like member that has no electric conductive property.

The electrically insulation part 351 is formed in the front and rear sides of the thermally insulating part 350, respectively. The insulating plates 35 are arranged, like the insulating plates 25 and 26 of the 2nd embodiment, between the bus bars with which the cooling fins are disposed and between the cases.

Next, with reference to FIG. 9, a cooling operation and an effect of the battery unit for vehicles are explained.

The battery unit can radiate the heat generated inside the battery to a refrigerant like the battery unit 1 of the 1st embodiment.

In addition, transfer of the heat between batteries can be intercepted with the insulating plates 35 which have adiabatic properties. Therefore, even if a certain battery generates unusual heat, an adjoining battery can be protected from thermal influence.

Although the insulating plate 35 is comprising the thermally insulating part 350 and the electrically insulation part 351, and has adiabatic property in the 3rd embodiment as an example, it is not restricted so. The electrically insulation part 351 may have thermal conductivity.

In this case, while intercepting transfer of the heat between batteries by the thermally insulating part 350, each battery can be cooled via the electrically insulation part 351.

4th Embodiment

Next, a battery unit for vehicles of the 4th embodiment is explained. The battery unit for vehicles of the 4th embodiment newly arranges coolers between the bus bars 11 and 12, and between the bus bars 11 and 13 of the battery unit for vehicles of the 1st embodiment.

Figure 10:
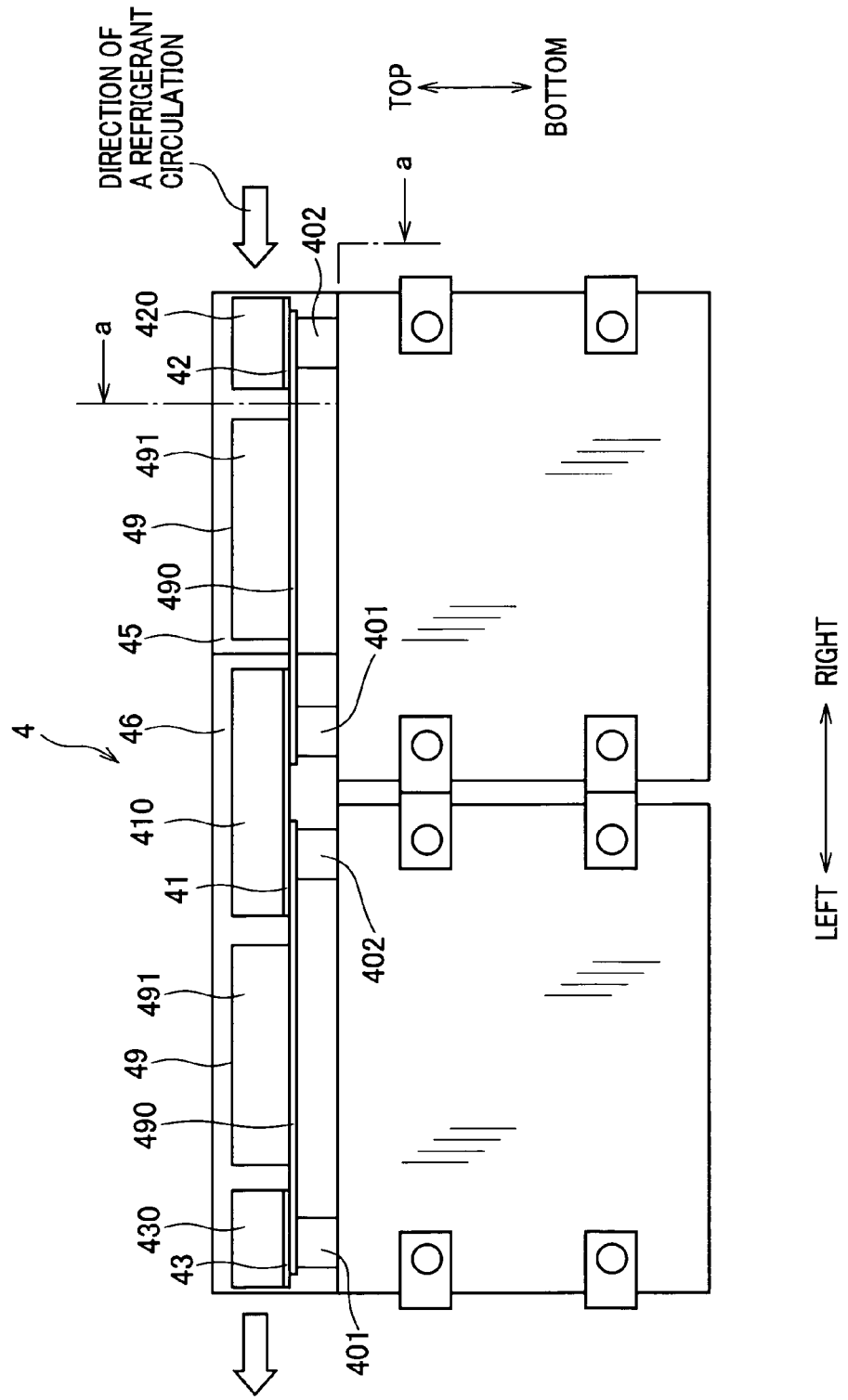
FIG. 10 shows the elevational view of the battery unit for vehicles in the state where there are no insulating plates of the foremost part in the 4th embodiment.
Figure 11:
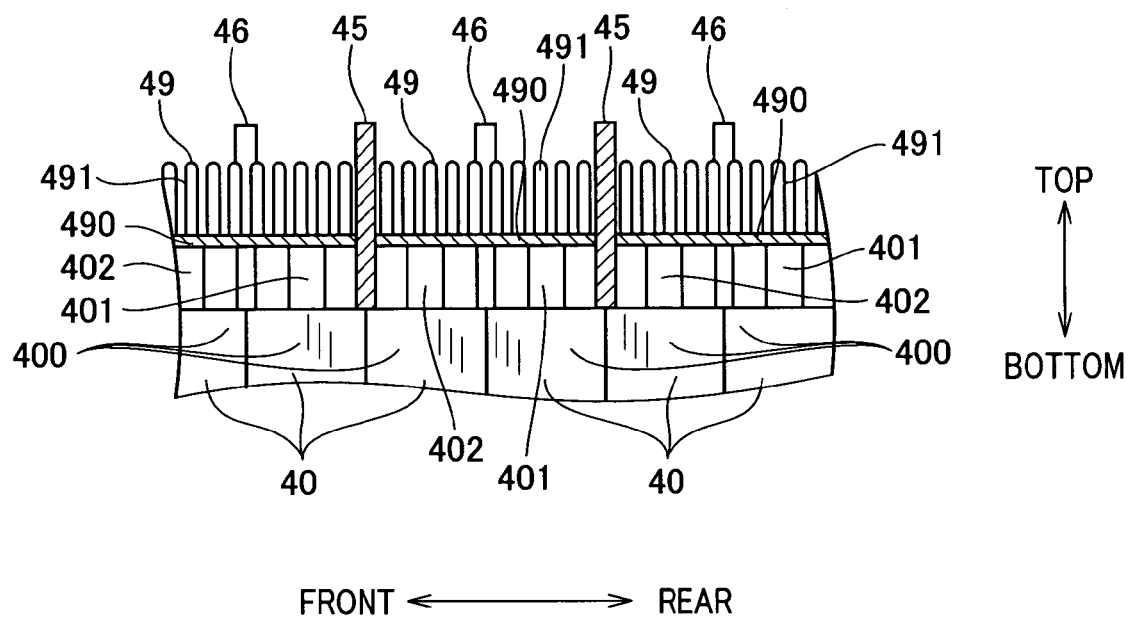
FIG. 11 shows the sectional view taken along the line a-a of FIG. 10.

First, the composition of a battery unit for vehicles is explained with reference to FIGS. 10 and 11. Here, FIG. 10 is an elevational view of the battery unit for vehicles in the state where there are no insulating plates of the foremost part in the 4th embodiment, and FIG. 11 is a sectional view taken along the line a-a of FIG. 10. Directions for front and rear, left and right, and top and bottom are introduced in the figures for convenience, in order to explain the battery unit for vehicles, and they show the same direction as the 1st embodiment.

Here, only the coolers, which are different parts from the battery unit for vehicles of the 1st embodiment, are explained, and explanations are omitted about common parts except the parts where the explanation is needed.

As shown in FIGS. 10 and 11, the battery unit for vehicles 4 (hereafter, simplified to "the battery unit 4") is provided with a plurality of coolers 49 (2nd heat conduction member).

A battery 40, a case 400 (battery container), a positive terminal 401 (terminal), a negative terminal 402 (terminal), bus bars 41-43 (connecting members), cooling fins 410, 420 and 430 (1st heat conduction members), and insulating plates 44, 45 and 46 (insulating members) are the same composition as the battery 10, the case 100, the positive terminal 101, the negative terminal 102, the bus bars 11-13, the cooling fin1 110,120 and 130, and the insulating plates 14, 15 and 16 in the 1st embodiment.

The coolers 49 are members that have no electrical conductivity and have a thermal conductivity for radiating heat efficiently. The coolers 49 comprise main parts 490 and fin parts 491. The main parts 490 are the rectangular plate-like members, and thermally connected to the pairs of terminals, i.e., the positive terminals 401 and the negative terminals 402.

The fin parts 491 are the wave-shaped plate-like members formed in the upper surfaces of the main parts 490. The both ends of the fin parts 491, which are wave-shaped, face to the right and to the left, and the fin parts 491 are formed on the upper surfaces of the main parts 490 to extend in the left-right direction.

Next, with reference to FIGS. 10 and 11, a cooling operation and an effect of the battery unit for vehicles are explained. The battery unit 4 can radiate the heat generated inside the battery 40 to a refrigerant like the battery unit 1 of the 1st embodiment.

In addition, the positive terminals 401 and the negative terminals 402 can be cooled via the coolers 49 that have thermal conductivity. Further, the coolers 49 have no electrical conductivity.

Therefore, the battery unit 4 can be cooled efficiently without short-circuiting the positive terminals 401 and the negative terminals 402.

Although the main parts 490 of the coolers 49 are connected to the positive terminals 401 and the negative terminals 402 in the 4th embodiment as an example, it is not restricted so. The main parts 490 may be connected to the bus bars 41-43 thermally.

In addition, although air is used for a refrigerant in the 1st-4th embodiments as examples, it is not restricted so. The refrigerants may be gas other than air or may be a fluid.

Moreover, although the battery unit for vehicles is cooled by the refrigerant in the 1st-4th embodiments as examples, it is not restricted so. The battery unit for vehicles may be heated with a heat carrier with a high temperature to adjust temperature.

Furthermore, although the battery unit for vehicles comprises the lithium ion battery in the 1st-4th embodiments as examples, it is not restricted so. The battery unit for vehicles may use other secondary batteries.

What is claimed is:

1. A battery unit for vehicles comprising:
a plurality of batteries,
a battery container,
each battery having a pair of terminals comprised of a positive terminal and a negative terminal, said pair of terminals projecting in the same direction from a surface of the battery container, and
first connecting members that connect positive and negative terminals of adjacent batteries for connecting the plurality of batteries electrically,
wherein, the plurality of batteries are installed with the terminals and the surface of the battery container facing in the same direction,
the terminals and the first connecting members are cooled or heated by a heat carrier that flows along the surface of the battery container in a flow direction parallel to a line extending between the terminals of each said pair of terminals of said installed batteries, and
the battery unit for vehicles further comprises an insulating member having no electrical conductivity that extends in a longitudinal direction that is parallel to the flow direction, said insulating member projecting from a same side of the battery container as said pair of terminals, and said insulating member projecting in the same direction that said pair of terminals project from the surface of the battery container, the direction in which the pair of terminals and the insulating member project being perpendicular to the flow direction and being perpendicular to the longitudinal direction in which the insulating member extends, the insulating member being disposed between the first connecting members that are electrically connected to different sets of adjacent batteries.

2. The battery unit for vehicles according to claim 1, wherein, the insulating member has high thermal conductivity and disposed between the batteries, where the insulating member is contacted thermally to the battery container.

3. The battery unit for vehicles according to claim 1,
wherein, the insulating member is thermally insulating and disposed between the batteries, where the insulating member is contacted to the battery container.

4. The battery unit for vehicles according to claim 1,
wherein, the insulating member has elasticity in a direction perpendicular to the flow direction.

5. The battery unit for vehicles according to claim 1,
the battery unit for vehicles further comprises a first heat conduction member extending in the flow direction and connected thermally to the first connecting members.

6. The battery unit for vehicles according to claim 1,
the battery unit for vehicles further comprises a second heat conduction member having no electrical conductivity extending in the flow direction and that is connected thermally at least to the one of the pairs of terminals or the first connecting members.

7. The battery unit for vehicles according to claim 1,
wherein, the first connecting members connect the plurality of batteries in series.

8. The battery unit for vehicles according to claim 1,
wherein, the plurality of batteries is equipped in a vehicle.

* * * * *